July 15, 1941.    H. G. MUSOLF    2,249,487
LIQUID SEPARATING CONTAINER
Filed Feb. 13, 1940
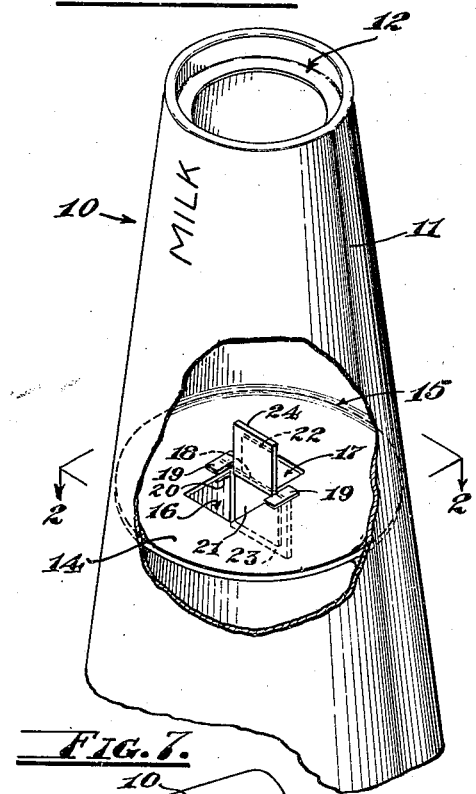
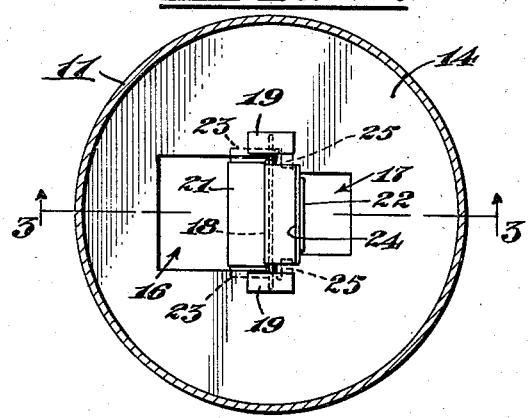
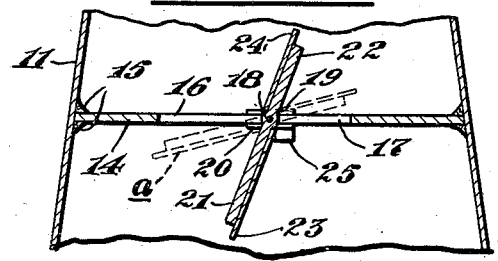
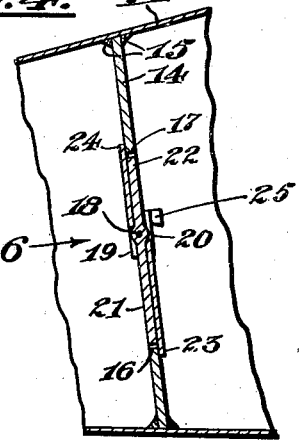
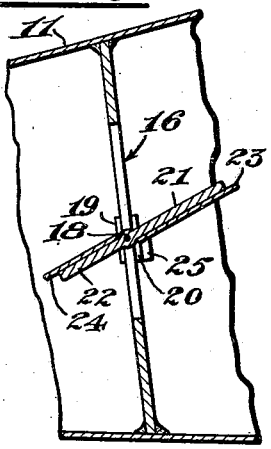
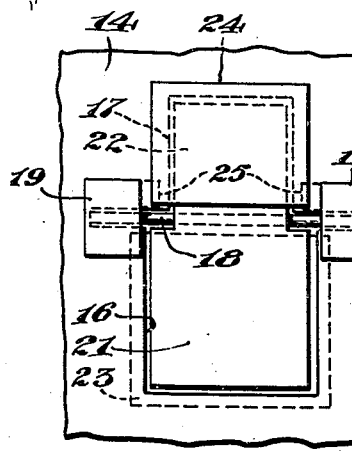
Inventor
Herbert G. Musolf
By
Attorney Patented July 15, 1941

2,249,487

UNITED STATES PATENT OFFICE 2,249,487

LIQUID SEPARATING CONTAINER

Herbert G. Musolf, Long Beach, Calif.

Application February 13, 1940, Serial No. 318,632

9 Claims. (Cl. 210—51.5)

This invention relates to containers and more particularly pertains to a container for milk, and to the type of milk containers made of paper employed in the packaging and distribution of milk in small quantities as the pint and quart paper bottles now generally in use.

Such milk containers being opaque conceal the body of cream that rises to the top of the milk content of the container which precludes or at least renders difficult the removal of the cream from the container apart from the milk without the employment of a special tool.

The primary object of the present invention is to provide a construction in the container whereby a body of cream associated with a body of milk in the container may be poured from the latter in a manner to effect its separation from the milk, and whereby the milk may be retained in the container until after pouring of the cream has been effected.

Another object is to provide a construction of the above character which may be operated either to effect separation of the cream and milk as above stated or to effect pouring of the milk and cream content of the container without effecting separation thereof.

Another object is to provide an appliance for milk bottles for the purposes and having the characteristics above set forth which embodies a valve structure so fashioned as to permit proper action of the natural process of separation of cream from the milk content of the bottle and the floatation of the cream in the upper portion of the bottle above the valve structure, and in which the valve structure is operable to close off the cream at or near the cream line on tilting the bottle to a pouring position with a certain side thereof uppermost, and is also operable on tilting the bottle with the opposite side thereof uppermost to open and permit discharge of the milk.

A further object is to provide a valve structure that is subject to being readily applied to a bottle and which is so simple and economical in construction as not to materially increase the cost of the container equipped therewith.

With the foregoing objects in view together with such other objects and advantages as may subsequently appear, the invention is carried into effect as illustrated by way of example in the accompanying drawing in which:

Fig. 1 is a perspective view of a fragmentary portion of a container with portions broken away showing it equipped with a cream separating valve structure:

Fig. 2 is a plan view and section taken on the line 2—2 of Fig. 1:

Fig. 3 is a detail in vertical section taken on the line 3—3 of Fig. 2:

Fig. 4 is a detail in section depicting the valve structure with the parts disposed in the cream separating position when the container is tilted to a pouring position with a predetermined side portion thereof uppermost:

Fig. 5 is a detail in section showing the valve structure with the parts disposed in an open position when the container is tilted to a pouring position with the side portions reversed from the position shown in Fig. 4:

Fig. 6 is an elevational view as seen in the direction indicated by the arrow 6 in Fig. 4 showing the valve in its closed cream separating position:

Fig. 7 is a perspective view depicting the manner of tilting the container in effecting separation of cream from the milk content thereof.

Referring to the drawings more specifically 10 indicates generally a container which is here shown as comprising a conventional type of paper bottle having a conical shaped side wall 11 and which is formed with an opening 12 at its reduced end, through which liquid may be poured into the bottle in effecting filling thereof and through which the liquid may be poured from the bottle in the usual manner. It will be understood however, that the container may be of any suitable construction since the invention is applicable to any form of container that is adapted to be formed with a transverse partition such as indicated at 14; the invention not being dependent upon any particular construction of the container per se.

In carrying out the invention the partition 14 is located to extend transversely of the container 10 intermediate the ends thereof and spaced from the opening 12 at a point substantially corresponding to the line of separation of cream and milk that will occur on allowing the container to stand with a mixed milk and cream content such length of time as is required for the cream to separate from the milk and rise to the upper portion of the container; such line being commonly referred to as the cream line.

The partition 14 may be formed of any suitable material but is preferably made of a sheet fibrous material such as paper, and is held in place in the container in any suitable fashion such as by wedging it against the tapered wall 11 and applying an adhesive sealing material 16 at the joint between the margin of the partition and the contiguous portion of the container wall 11.

Formed in the partition 14 is a pair of openings or apertures 16—17 of differential areas that preferably extend on opposite sides of the center of the partition with the openings meeting on a plane extending axially of the container. However such location of the pair of openings or apertures 16—17 is not essential and although it is desirable that the openings meet such is not necessary. The openings or apertures 16—17 are here shown as rectangular, but it will be manifest that they may be of any other suitable marginal configuration as long as the area of the opening 16 exceeds that of the opening 17.

A shaft 18 extends across the juncture of the openings or apertures 16—17 and is turnably supported at its ends on the partition 14; the shaft being held in place on the partition 19—20 which overlie the ends of the shaft and are adhered to the partition; the ends of the shaft being positioned in opposed open ended slots $a$ leading from the side margins of the openings 16—17 at the juncture thereof, and the straps 19—20 overlying said slots on the opposite sides of the partition. Mounted on the shaft 18 and extending from opposite sides thereof is a pair of vanes 21—22 which are adapted to be positioned in the openings or apertures 16—17 respectively in alignment with the partition 14; the vanes having marginal contours complementary to those of the openings but of slightly smaller dimensions so that the vanes may be freely moved in and out of a position within the openings. As a means for preventing passing of the vanes through the openings and for affording a seal for the gap afforded between the edges of the vanes and the margins of the openings when the vanes are positioned in the openings the vane 21 is formed with a marginal flange 23 that will underlie the partition when the vane is in the opening 16, and the vane 22 is formed with a marginal flange 24 that will overlie the partition when the vane 22 is in the opening 17. The vanes 21—22 and their associated parts constitute a valve structure for controlling discharge of liquid from the container.

The vane 21 is of greater weight than the vane 22 to form a counterweight and by reason thereof the vanes will tend to normally occupy a vertical position on the pivoted shaft and accordingly when the container or bottle 10 is disposed in an upright position in which the partition 14 will extend horizontally, the vanes will tend to extend perpendicular to the partition between the openings or apertures 16—17 thereby maintaining the latter fully open so that liquid poured into the upper end of the container will flow into the lower portion thereof through the openings or apertures 16—17 and thus permit filling the container in the manner commonly employed in filling milk bottles. However means are provided for limiting the movement of the vanes outwardly relative to the partition, so that the vanes will normally come to rest under the urge of the heavier vane 21 at a position slightly less than the perpendicular, which means is here shown as comprising lugs 25 formed on the straps 19—20 on one side of the partition extending outwardly adjacent the shaft 18 which lugs are adapted to abut the vane 21 and limit the downward swing thereof to an inclination to the perpendicular relative to the partition, as shown in Fig. 3. This counterweight of the vane assembly serves to produce an automatic valve structure that will act on tilting the container to a pouring position to either completely close the openings or apertures 16—17 to maintain the openings or apertures open according to whether the container is tilted with the opening 16 disposed lowermost or uppermost.

In the operation of the invention, the container 10 is filled with milk and cream in the usual manner as by pouring a mixture of cream and milk therein or by first filling the space in the lower portion of the container beneath the partition 14 with milk from which cream has been separated and thereafter filling the space above the partition with cream. During the filling operation the vanes 21—22 will tend to remain in their nearly upright position, but when the container is filled to such extent as to submerge the vanes, the latter by reason of the lower vane 21 having greater buoyancy than the upper vane 22 because of its larger dimensions tends to rise toward the partition so as to close, or at least partly close the openings 16—17 as indicated in dotted lines $a$ in Fig. 3.

In event the container is filled with a mixture of milk and cream the container is allowed to stand in an upright position while the natural separation of the cream from the milk takes place, during which period the cream rises to the top of the milk. A portion of the cream will accummulate beneath the partition 14 and another portion contained in the milk above the partition will accummulate in the upper end portion of the bottle; the separated milk in the above partition by reason of its weight acting to press the larger vane 21 slightly downward thereby allowing the cream accummulated below the partition 14 to flow upward through the then partly opened opening 17 past the vane 22. In this fashion all the cream content of the container will accummulate in the chamber in the upper portion of the container above the partition 14.

When it is desired to pour the cream from the container apart from the milk, the container is tilted to a pouring position with the opening 16 lowermost as shown in Figs. 4 and 7 whereupon the vanes 21-22 and their associated flanges 23—24 will be caused to tightly close the openings or apertures 16—17 by reason of the weight of the milk in the container imposing a head on the larger vane 21, thereby confining the milk in the container while the cream is being poured. In this fashion any portion or all of the cream in the container above the partition 14 may be poured apart from the milk content of the container.

When it is desired to pour the milk from the container either with such cream as may be present or after having effected separation of the cream as above described, the container is tilted to its pouring position with the opening 16 uppermost whereupon the vanes 21—22 will be caused to occupy their original position relative to the openings or apertures 16—17, since the larger and heavier vane 21 will swing downwardly toward the smaller opening 17 while the smaller lighter vane 22 will swing upwardly toward the larger opening 16 as shown in Fig. 5. This movement and positioning of the vanes is augmented by the tendency of the milk at the then lower portion of the inclined bottle by reason of the head thereon to flow through the lower opening 17 against the back and underside of the vane 22 and thereby act to swing this upwardly with a consequent downward movement of the vane 21 to the limit of its movement determined by the shoulders 25 abutting the vane 21. When the vanes are so arranged full opening of the openings or apertures 16—17 will be effected as shown in Fig. 5, and thereby permitting free flow of the milk to discharge from the container.

As a means for enabling determining the side portion of the container to be positioned uppermost in tilting the container to either of the pouring positions, the opposite sides of the container are provided with suitable surface indicia such as the word "Milk" and "Cream" as depicted in Figs. 1 and 7 respectively, the indicia "Milk" serving to denote that when the side of the container bearing same is uppermost the milk or milk and cream content of the container will pour and the indicia "Cream" indicating that when the side of the container bearing same is uppermost the cream content of the container will pour therefrom apart from the milk content.

In the application of the invention to milk bottles it is essential that the parts be formed of materials that are not deleterious to milk, and accordingly the partition 14 and the vanes 21—22 with their associated flanges 23—24 are formed of paper as are the straps 19—20, while the shaft 18 is preferably formed of hard wood or fiber; the entire structure being coated with wax to render the surfaces thereof non-absorptive.

While I have shown and described specific embodiments of my invention, I do not limit myself to the exact details of construction set forth, and the invention embraces such changes, modifications and equivalents of the parts and their formation and arrangement as come within the perview of the appended claims, and while I have set forth the invention as applied to the separation of cream from milk it manifestly is applicable for use in effecting separation of any mechanically combined liquids of different specific gravities such that the lighter liquid will separate from the other and rise to the top thereof.

I claim:

1. A container for milk and cream having an opening at its upper end, a partition mounted in the container to extend on a predetermined cream line and having an opening therein, and a valve pivoted between its ends on said partition and having the portion thereof on one side of the pivot of greater area than the portion on the other side of the pivot and disposed to move outwardly to seat against the inner side of the partition over a part of said opening while the smaller portion of the valve is disposed to move inwardly to seat on the outer side of the partition over the remainder of said opening, said valve being buoyant and subject to opening and closing responsive to hydrostatic pressure of the liquid in the container.

2. In a container for milk and cream having an outlet, a partition dividing the said container on a predetermined cream line and having an opening therein and a valve pivoted on the partition and having a portion of larger area on one side of the axis of the pivot and a portion of smaller area on the other side of said axis, and the portion of larger area disposed to seat against one side of the partition and the portion of smaller area disposed to seat against the other side of the partition, and both portions subject to being opened and closed responsive to hydrostatic pressure of the liquid in the container and the buoyancy of the valve, and stop means for limiting the opening movement of the valve.

3. In a container for milk and cream having an outlet at one end, a partition dividing said container on a predetermined cream line and having an opening therein, a valve having portions of different areas, and being pivoted on the partition at a point between said portions, so as to dispose one of said portions to seat against one side of the partition to close a part of said opening and the other portion to seat against the other side of the partition to close the remainder of said opening with both portions subject to opening and closing movement responsive to pressure of the liquid in the container when the latter is in upright and pouring positions, whereby when differential hydrostatic pressures occur as a result of a natural separation of the cream and milk in the container, the valve will open and permit cream to rise above the partition and milk to settle below the partition; and when the container is tilted into pouring position with the larger portion of the valve lowermost, the valve will be held closed by hydrostatic pressure of the milk so that cream only will flow from the container; and when the container is tilted into pouring position with the larger portion of the valve uppermost, the liquid pressure against the then lowermost portion of the valve will open the valve and allow the liquid between the partition and the bottom of the bottle to flow through said opening.

4. A container for milk and cream having an outlet, a partition dividing the container on a predetermined cream line into milk and cream compartments and having an opening therein, a valve pivoted on the partition and having a portion of large area on one side of the axis of the pivot disposed to seat against the milk compartment face of the partition to close a part of said opening, and a portion of smaller area on the other side of said axis disposed to seat against the cream compartment face of said partition to close the remainder of the opening, with said portions operating to open and close said opening responsive to pressure of the liquid in the container and in such manner that when the latter is upright and a natural separation of milk and cream takes place in the container, the resultant differential hydrostatic pressures acting on said portions will cause the valve to open so that the cream will rise above and the milk settle below the partition and the valve will close following such separation, and when the container is tilted into pouring position with the larger portion of the valve lowermost the pressure of the liquid in the container will hold the valve closed so that cream only will flow from said outlet, and when the container is tilted into pouring position with the larger portion of the valve uppermost the smaller portion will be acted on by pressure of the liquid in the milk compartment to open the valve to flow of liquid from said milk compartment.

5. A container for milk and cream having an outlet, a partition dividing said container on a predetermined cream line into milk and cream compartments and having an opening therein, and a valve having portions of different areas and being pivoted on the said partition so as to dispose one of its portions to seat against one face of the partition to close a part of said opening and the other of its portions to seat against the other face of the partition to close the remainder of said opening, said opening having large and small areas corresponding to said valve portions; said portions of the valve responding to liquid pressure to open and close said opening in such manner that when the bottle is tilted into pouring position with one of said valve portions lowermost, the valve will be held closed by liquid pressure to prevent discharge of liquid from the milk compartment, and when the container is tilted into a pouring position with the other valve portion lowermost, the valve will be opened by liquid pressure and allow liquid from the milk compartment to flow through said opening.

6. The invention as set forth in claim 5 wherein said portions of the valve will also respond to fluid pressure occurring as a result of natural separation of the milk and cream in the container whereby the cream may rise above and the milk settle below said partition.

7. A container for milk and cream having an outlet, a partition dividing said container on a predetermined cream line into milk and cream compartments and having an opening therein, and a valve means on said partition operating responsive to liquid pressures in the container when the container is disposed in predetermined positions, for controlling the flow of said liquid through said opening, whereby with the container in one of said positions and tilted to pour the contents thereof, the valve will close, and with the container disposed in another of said positions and tilted to pour the contents thereof, the valve will open.

8. The invention as set forth in claim 7 wherein said valve means will open responsive to liquid pressures thereon when a natural separation of milk and cream takes place in the container.

9. The invention as set forth in claim 7 wherein the different positions effective of the opening and closing of the valve responsive to liquid pressure when the bottle is tilted into pouring positions, are attained by turning the container about its longitudinal axis.

HERBERT G. MUSOLF.